United States Patent
So

(10) Patent No.: US 8,305,526 B2
(45) Date of Patent: Nov. 6, 2012

(54) METHOD FOR PROVIDING LIGHT TO LIQUID CRYSTAL PANEL

(75) Inventor: Hyun Jin So, Seoul (KR)

(73) Assignee: LG Display Co., Ltd., Seoul (KR)

( * ) Notice: Subject to any disclaimer, the term of this patent is extended or adjusted under 35 U.S.C. 154(b) by 46 days.

(21) Appl. No.: 12/648,202

(22) Filed: Dec. 28, 2009

(65) Prior Publication Data

US 2010/0099324 A1    Apr. 22, 2010

Related U.S. Application Data

(62) Division of application No. 11/523,638, filed on Sep. 20, 2006, now Pat. No. 7,656,476.

(30) Foreign Application Priority Data

May 18, 2006 (KR) .......................... 10-2006-0044624

(51) Int. Cl.
*G02F 1/1335* (2006.01)

(52) U.S. Cl. ........................................ 349/106; 349/143

(58) Field of Classification Search .................... 349/106
See application file for complete search history.

(56) References Cited

U.S. PATENT DOCUMENTS

| 6,853,416 | B2 | 2/2005 | Hamamoto et al. | |
| 7,388,630 | B2 * | 6/2008 | Shin et al. | 349/109 |
| 7,436,472 | B2 * | 10/2008 | Baek | 349/106 |
| 2004/0051724 | A1 * | 3/2004 | Elliott et al. | 345/694 |

* cited by examiner

*Primary Examiner* — Eric Wong
(74) *Attorney, Agent, or Firm* — Birch, Stewart, Kolasch & Birch, LLP

(57) ABSTRACT

The invention relates to a method of manufacturing a liquid crystal display, comprising forming a color filter array substrate including at least a red (R) color filter and a green (G) color filter; disposing a thin film transistor array substrate oppositely to the color filter array substrate; sealing a liquid crystal layer between the color filter array substrate and the thin film transistor array substrate; and disposing a backlight unit to a surface of the thin film transistor array substrate, said backlight unit providing white light having an adjusted blue spectrum using at least a light emitting diode (LED) unit.

5 Claims, 12 Drawing Sheets

| Color | Wavelength(nm) |
|---|---|
| Red | 645 ~ 700 |
| Green | 490 ~ 530 |
| Blue | 430 ~ 480 |

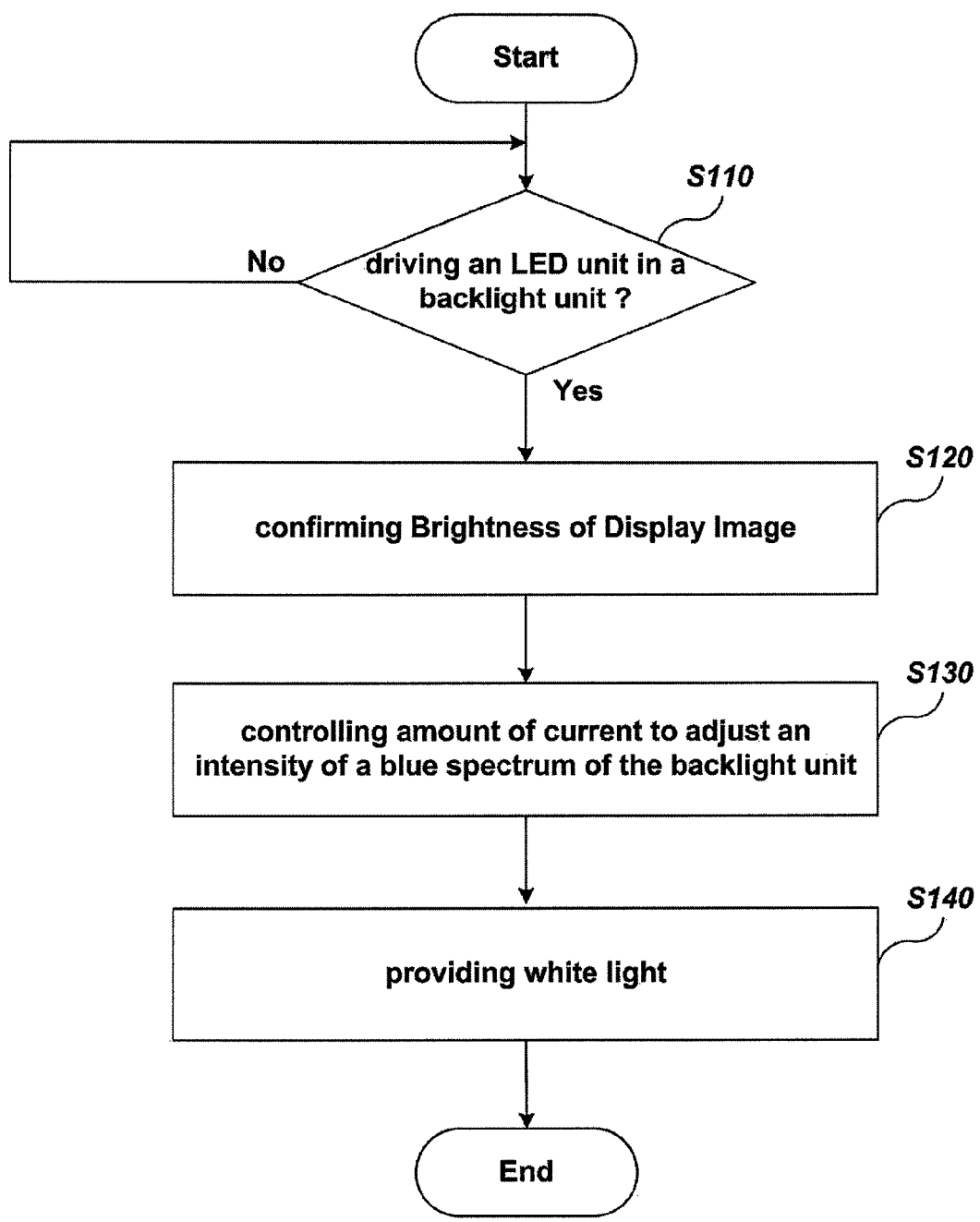

METHOD FOR PROVIDING LIGHT TO LIQUID CRYSTAL PANEL

This Application is a Divisional of U.S. patent application Ser. No. 11/523,638 filed Sep. 20, 2006 now U.S. Pat. No. 7,656,476 for which priority is claimed under 35 U.S.C. §120 and which claims priority under 35 U.S.C. §119(a) to Patent Application No. 10-2006-0044624 filed in Korea on May 18, 2006, the entire contents of each of which are hereby incorporated by reference in their entirety.

BACKGROUND OF THE INVENTION

1. Field of the Invention

The present invention relates to a liquid crystal display, and more particularly, to a liquid crystal display and corresponding method using a backlight unit that provides white light having an adjusted blue spectrum.

2. Description of the Background Art

A liquid crystal display includes a liquid crystal layer having a dielectric anisotropy formed between upper and lower transparent insulating substrates. Further, an electric field is applied to the liquid crystal layer to change the alignment of molecules of a liquid crystal material such that the amount of light transmitted through the liquid crystal layer is adjusted, thereby displaying a desired image.

Because the liquid crystal display is small in size, is light in weight, and has low power consumption, various devices such as a computer and a mobile telephone use liquid crystal displays.

Further, the liquid crystal display includes a color filter substrate, a thin film transistor array substrate, and a liquid crystal panel having a liquid crystal layer formed between the two substrates. The liquid crystal display also includes a backlight unit for providing light to the liquid crystal panel. The liquid crystal display may also include an external casing for protecting the liquid crystal panel and the backlight unit.

Hereinafter, a liquid crystal display in the related art will be described in detail.

As shown in FIG. 1, the related art liquid crystal display includes three red (R), green (G) and blue (B) sub-pixels forming a unit pixel Pa to provide a dot. Further, a plurality of dots is displayed on a frame to display a desired image.

As shown in FIG. 2, the unit pixel Pa includes a color filter 23 having red (R), green (G), and blue (B) filters 23a, 23b and 23c. The color filter array substrate also includes a transparent substrate 21 and a black matrix 22 formed on the transparent substrate 21. The black matrix 22 is for defining sub-pixel regions and blocking light leakage. The color filter array substrate also includes an overcoat layer 24 for planarizing the color filter layer 23.

Further, the black matrix layer 22 is formed on the transparent substrate 21 in a matrix shape and blocks light transmitted through the thin film transistor array substrate. Also, the color filter layer 23 exhibits a desired color corresponding to a light signal transmitted through the thin film transistor array substrate. In addition, the overcoat layer 24 compensates a step difference of the color filter layer 23 and protects the color filter layer 23.

As shown in FIG. 3, the light generated from a light source 30 (e.g., fluorescent lamp) disposed on the rear surface of the liquid crystal display is transmitted through a thin film transistor array substrate 10 and the color filter layer 23 to emit red (R) light, green (G) light and blue (B) light. At this time, image information is displayed by mixing the red (R), green (G) and blue (B) light. An example of a displayed image is shown in FIG. 4.

As shown in FIG. 4, the displayed image has a relatively low definition and brightness. That is, the light emitted from the backlight unit is transmitted through a first polarizer (not shown), an optical sheet (not shown), the thin film transistor array substrate 10, the liquid crystal layer, the color filter array substrate 20, and a second polarizer (not shown). Accordingly, the displayed image has a much lower definition and brightness, compared to the light emitted from the backlight unit.

Further, due to the structure of the related art liquid crystal display, it is difficult to improve a contrast ratio and brightness of the image.

SUMMARY OF THE INVENTION

Accordingly, one object of the present invention is to address the above-noted and other problems.

Another object of the present invention is to provide a liquid crystal display and a method for providing light to a liquid crystal panel that increases a contrast ratio and brightness to improve the quality of image information.

Yet another object of the present invention is to simplify a method for manufacturing a color filter array substrate and reduce a manufacturing cost.

Still another object of the present invention is to compensate for the deterioration of color and block light leakage by adjusting an optical spectrum of a light emitting diode backlight unit emitting white light.

To achieve these and other advantages and in accordance with the purpose of the present invention, as embodied and broadly described herein, the present invention provides in one aspect a liquid crystal display including a thin film transistor array substrate comprising sub-pixel regions, a color filter array substrate oppositely disposed to the thin film transistor array substrate, the color filter array substrate comprising color filters corresponding to at least a part of the sub-pixel regions, a liquid crystal layer formed between the color filter array substrate and the thin film transistor array substrate and a backlight unit configured to provide white light having an adjusted blue spectrum to a surface of the thin film transistor array substrate using at least a light emitting diode (LED) unit.

According to another aspect, the present invention provides a method of driving a liquid crystal display. The method includes driving at least a light emitting diode (LED) unit in a backlight unit to provide white light to the liquid crystal display, determining a brightness of an image displayed on the liquid crystal display, and adjusting an intensity of a blue spectrum of the white light provided by the backlight unit based on the determined brightness of the image.

According to another aspect, the present invention provides a method of manufacturing a liquid crystal display. The method includes forming a color filter array substrate including at least a red (R) color filter and a green (G) color filter, disposing a thin film transistor array substrate oppositely to the color filter substrate, sealing a liquid crystal layer between the color filter array substrate and the thin film transistor array substrate, and disposing a backlight unit to a surface of the thin film transistor array substrate. Further, the backlight unit provides white light having an adjusted blue spectrum using at least a light emitting diode (LED) unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 16 is a flowchart illustrating a method for providing light of a backlight unit according to an embodiment of the present invention.

DETAILED DESCRIPTION

Reference will now be made in detail to the preferred embodiments of the present invention, examples of which are illustrated in the accompanying drawings.

First, in one embodiment of the present invention, a white color filter is used instead of a blue color filter in a color filter substrate. In addition, the white color filter corresponds to a transparent color filter or no color filter such as a blank state material-less color filter, for example. The blank state material-less color filter means there is no material in an area corresponding to the color filter for the white light. Rather, the area remains in a blank state.

Further, when white light including a blue spectrum having a high intensity is transmitted from a white LED unit of a backlight unit to the white color filter, it is possible to exhibit a desired color. This is because human eyes can sense light in the visible light region (380 to 760 nm). Green light having a wavelength of 555 nm is best sensed, but blue light has a relatively low sensitivity. Accordingly, it is possible to exhibit a desired blue color using white light including the blue spectrum having a high intensity.

Figure 5:
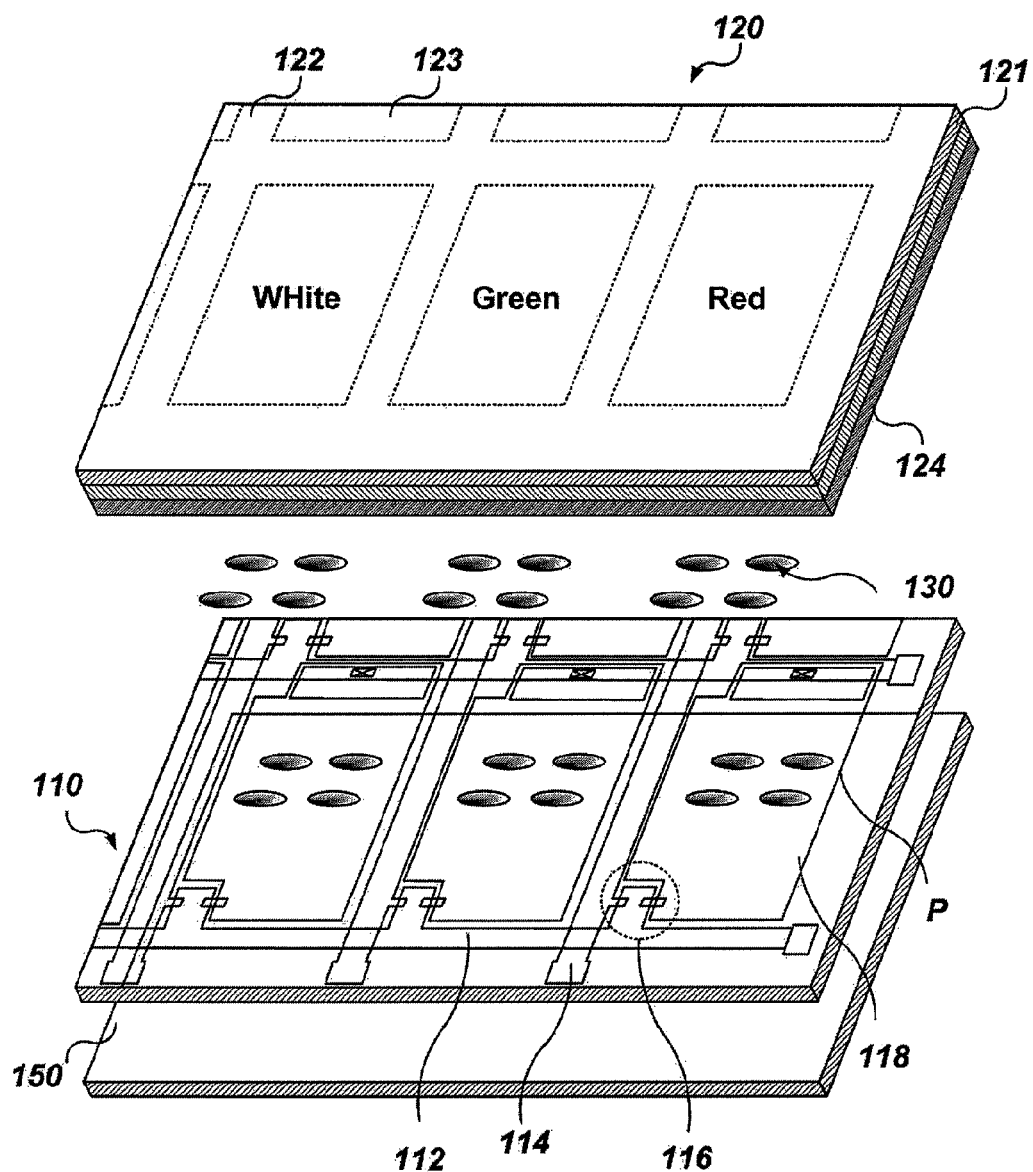
FIG. 5 is a perspective view illustrating a liquid crystal display according to an embodiment of the present invention.

Turning first to FIG. 5, which is a perspective view illustrating a liquid crystal display according to an embodiment of the present invention. As shown, the liquid crystal display includes a color filter array substrate 120, a thin film transistor array substrate 110, a liquid crystal panel having a liquid crystal layer 130 formed therebetween, and a LED backlight unit 150 disposed on a rear surface of the liquid crystal panel.

In the liquid crystal panel, a plurality of gate lines 112 and a plurality of data lines 114 intersect each other on the thin film transistor array substrate 110. Further, sub-pixel regions P are defined by the intersection, and the defined sub-pixel regions P are formed in a matrix shape. A pixel electrode 118 is also formed in each sub-pixel region P and a thin film transistor 116 is formed at the intersection between each of the gate lines 112 and the data lines 114.

In addition, the thin film transistor 116 is a switching element and transmits a data signal applied to the data line 114 to the pixel electrode 118 in response to a gate signal of the gate line 112. Further, the pixel electrode 118 may be made of a transparent conductive material such as indium tin oxide (ITO) or indium zinc oxide (IZO) and generates an electrical field by switching the thin film transistor 116 to adjust the alignment of the liquid crystal layer 130.

Also, in the liquid crystal layer 130, the alignment of liquid crystal molecules varies depending on a vertical alignment between the thin film transistor array substrate 110 and the color filter array substrate 120 or in-plane switching in the thin film transistor array substrate 110. Further, the amount of light transmitted depending on the alignment of the liquid crystal molecules varies to display various amount of image information.

In addition, the liquid crystal layer 130 can operate in a twisted nematic (TN) mode, a vertical alignment (VA) mode, an in-plane switching (IPS) mode or a fringe field switching (FFS) mode. Moreover, the color filter array substrate 120 faces the thin film transistor array substrate 110 with the liquid crystal layer 130 interposed therebetween such that a uniform gap is maintained.

Figure 6:
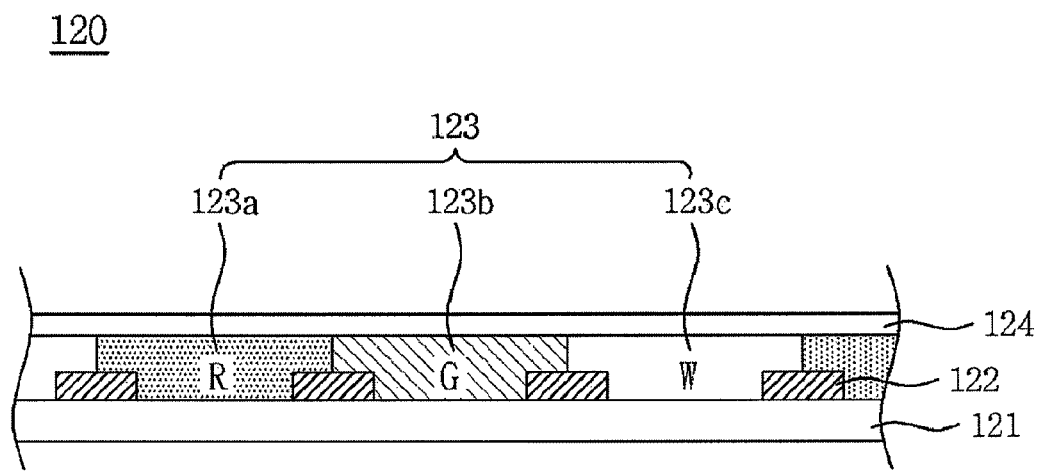
FIG. 6 is a cross-sectional view illustrating a color filter array substrate of the liquid crystal display according to an embodiment of the present invention.

Next, as shown in FIG. 6, the color filter array substrate 120 includes a transparent substrate 121, a black matrix 122 formed on the transparent substrate 121 in a matrix shape, and a color filter layer 123 in which red (R), green (G), and white (W) color filters 123a, 123b and 123c are formed in the sub-pixel regions defined by the black matrix 122. An overcoat layer 124, which is a flat layer, may also be formed on the color filter layer 123. As discussed above, the white (W) color filter 123c corresponds to a transparent color filter or blank state material-less color filter. That is, wavelengths contained within the white light spectrum are allowed to pass through the white (W) color filter.

In addition, the black matrix 122 is formed at a position specified by an exposure process such that among light signals transmitted through the thin film transistor array substrate 110, light signals having a high distortion possibility are selectively blocked.

Further, the red (R), green (G) and white (W) color filters 123a, 123b and 123c are disposed in the respective sub-pixel regions defined by the black matrix 122. As shown, ends of the color filters 123a, 123b and 123c or the boundary regions among the color filters 123a, 123b and 123c partially overlap the black matrix 122.

In addition, the red (R) color filter 123a and the green (G) color filter 123b are formed by applying a red and green color resin, respectively and performing an exposure and development process. Further, the red and green color filter 123a, 123b may be formed using an inkjet printing method. The white (W) color filter 123c is a colorless transparent filter made of a colorless transparent resin or is in a material-less blank state (i.e., no color filter).

Further, because the white (W) color filter 123c transmits light that was transmitted through the substrate 110 and the liquid crystal layer 130 from the rear surface without light loss, it is possible to increase the brightness. In addition, when a material is not formed in the white (W) color filter 123c, a manufacturing method can be simplified and a manufacturing cost can be reduced, because the step of forming the white (W) color filter 123c is not performed.

Also, the overcoat layer 124 covers the color filter layer 123 such that the step difference of the color filter layer 123 is flat. The overcoat layer 124 is made of a transparent resin material, for example.

In addition, when the white (W) color filter 123c is made of a transparent resin, the white color filter 123c and the overcoat layer 124 may be formed in a single step using the same material. That is, after the red (R) and green (G) color filter 123a, 123b are formed, the white (W) color filter 123c and the overcoat layer 124 may be simultaneously formed using the material of the overcoat layer 124.

Further, although the white (W) color filter 123c may be made of a transparent resin material different from that of the overcoat layer 124 or the same material as the overcoat layer 124, the filter 123c and overcoat layer 124 may be formed by the same step or separate steps. The overcoat layer 124 may also not be formed at all.

Figure 7:
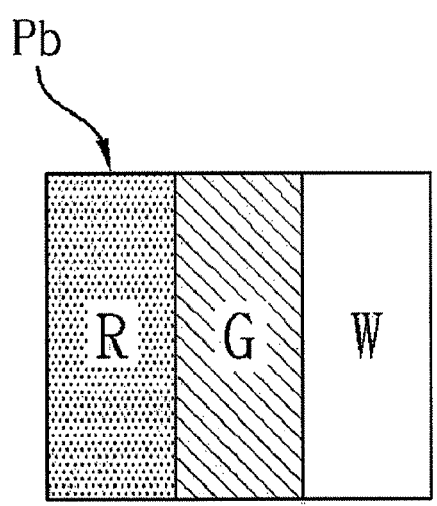
FIG. 7 is an overview illustrating a unit pixel of the color filter array substrate according to an embodiment of the present invention.

In addition, in the color filter layer 123, each of the color filters 123a, 123b, and 123c forms a sub-pixel. Thus, the red (R), green (G) and white (W) sub-pixels form a unit pixel Pb to display an image, as shown in FIG. 7.

Figure 8:
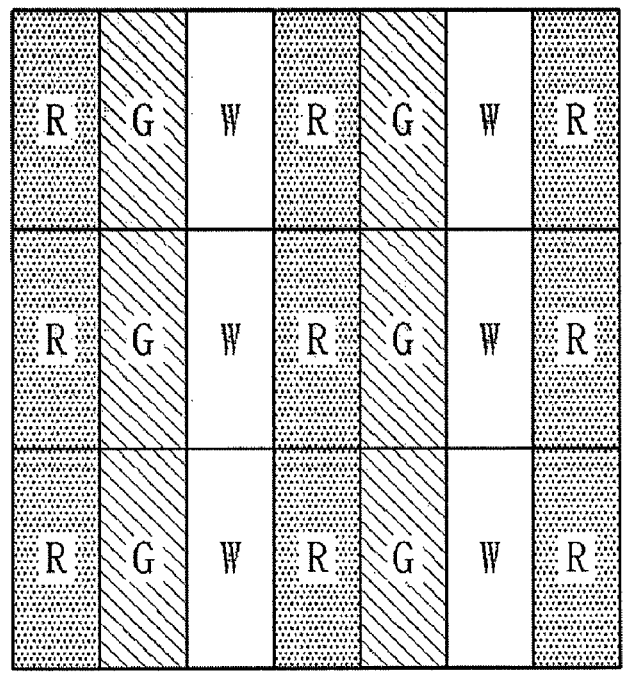
FIGS. 8 to 10 are overviews illustrating various arrangement structures of the unit pixel shown in FIG. 7.
Figure 9:
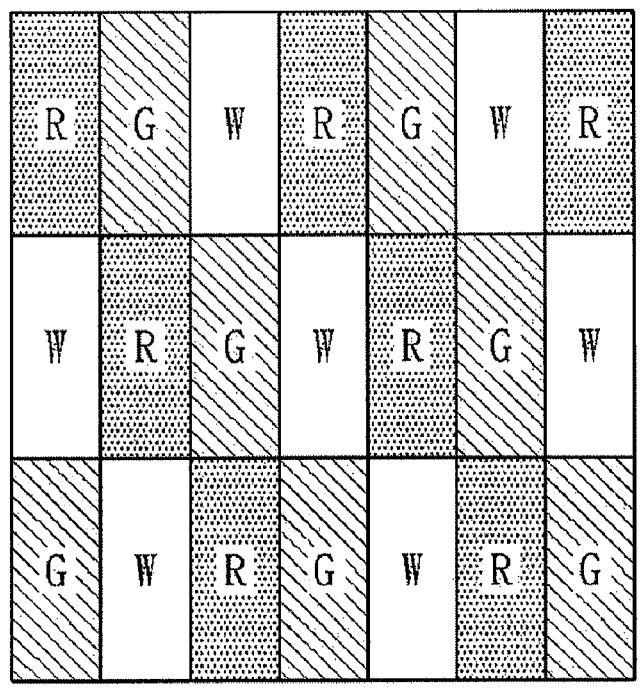
Figure 10:
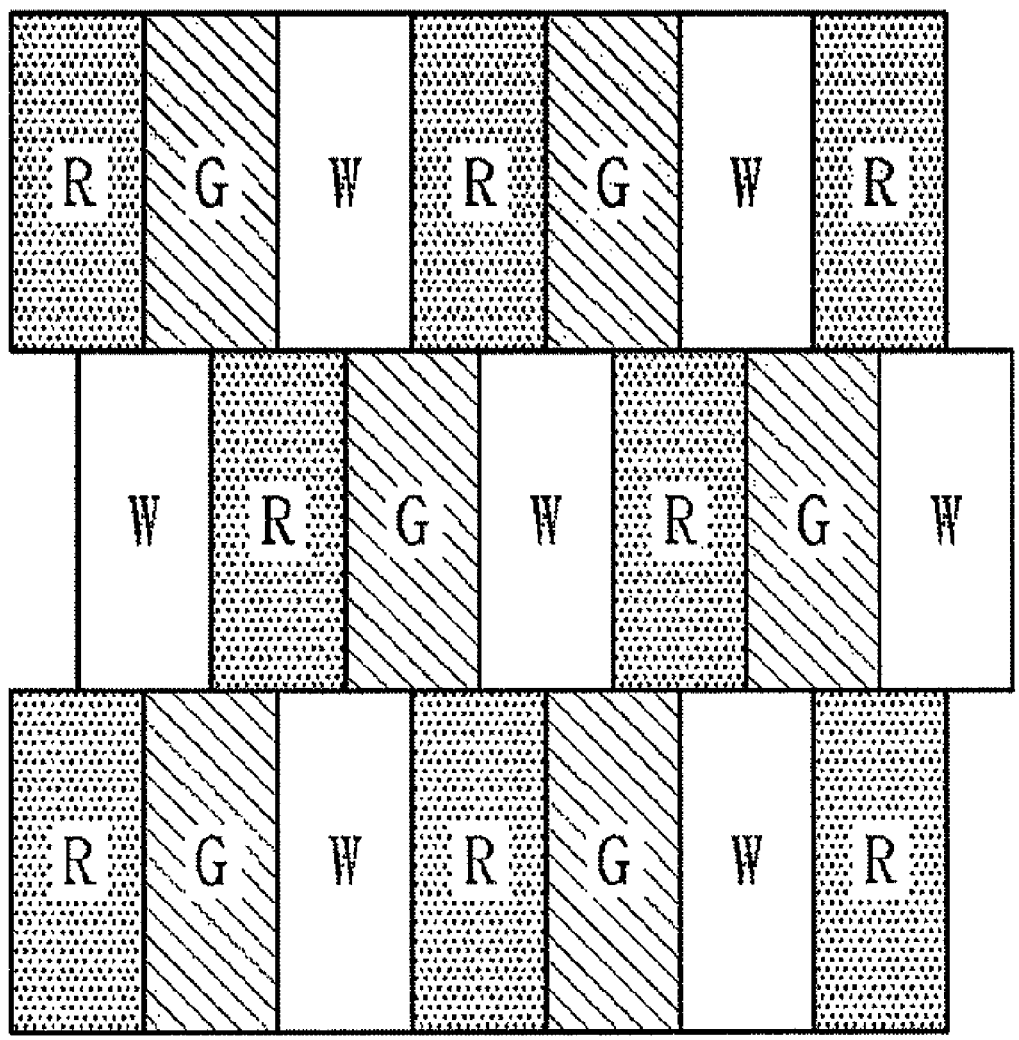

That is, as shown in FIG. 8, a stripe arrangement structure includes the red (R), green (G) and white (W) sub-pixels sequentially arranged and the sub-pixel of the same color is arranged in the same column. In addition, as shown in FIG. 9, a mosaic arrangement structure includes red (R), green (G) and white (W) sub-pixels sequentially arranged in a row and the sub-pixels of red (R), green (G) and white (W) are shifted by one sub-pixel in a next lower row. Further, as shown in FIG. 10, a delta arrangement structure includes red (R), green (G) and white (W) sub-pixels arranged in a delta shape and the sub pixels of the same color are not adjacent to each other in all directions. However, the present invention is not limited to these arrangements.

Figures 11, 12:
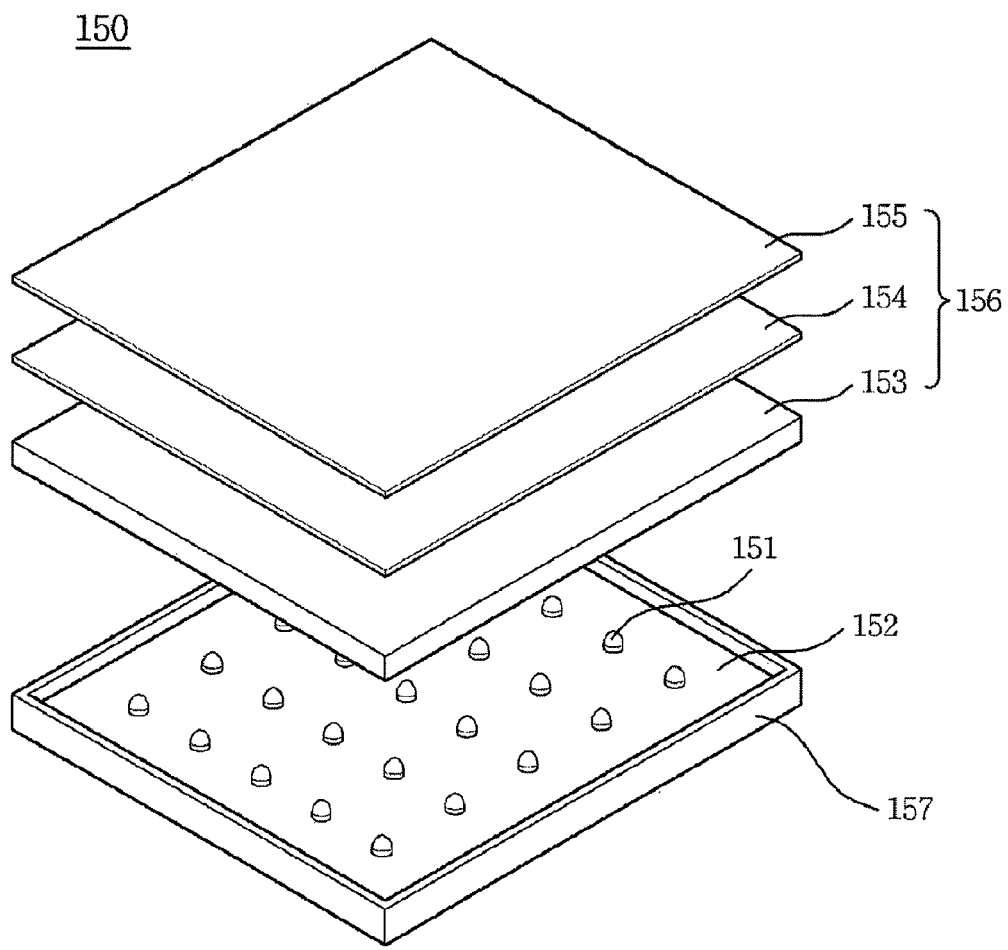
FIG. 11 is a perspective view illustrating an LED backlight unit of the liquid crystal display according to an embodiment of the present invention.
FIG. 12 is a table explaining the property of the LED shown in FIG. 11.

Next, the structure of the LED backlight unit 150 according to an embodiment of the present invention will be described. In more detail, and as shown in FIG. 5, the LED backlight unit 150 is disposed on the rear surface of the liquid crystal panel and provides light to the liquid crystal panel. As shown in FIG. 11, the LED backlight unit 150 includes at least one white light emitting diode (LED) unit 151 for emitting white light as a light source, a reflective plate 152 for reflecting the white light emitted from the white LED unit 151, an optical sheet 156 for diffusing and focusing the white light emitted from the white LED unit 151 and the reflective plate 152 and for providing the white light to the liquid crystal panel (not shown). The backlight unit 150 also includes an outer casing 157, which is generally a bottom casing.

Further, the optical sheet 156 prevents a shape of the white LED unit 151 from being displayed on a display surface of the liquid crystal panel and provides the light having a uniform brightness distribution. To improve the diffusion of the white light generated at the white LED unit 151, a diffusion sheet 153 and a prism sheet 154 may be provided. A protective sheet 155 may also be provided on the front surface of the prism sheet 154.

In addition, the reflective plate 152 is formed within the outer casting 157 and has a plurality of holes formed in the surface thereof. The holes correspond one-to-one to the positions of the white LED unit 151. Further, the white LED unit 151 is mounted on a lowest layer in the outer casing 157 in a predetermined pattern and is inserted in the holes of the reflective plate 152 to be exposed from the surface of the reflective plate 152. The optical sheet 156 is also disposed on the white LED unit 151.

Also, the white LED unit 151 includes chips for emitting red (R) light, green (G) light and blue (B) light. Further, white light is exhibited by mixing red (R), green (G) and blue (B) light. In addition, the chips are controlled by a LED driving unit such that the mixture of the red (R), green (G) and blue (B) light are well exhibited.

Also, as shown in FIG. 12, in an embodiment of the present invention, the white light emitted from the white LED unit 151 is formed by mixing a red (R) spectrum, a green (G) spectrum and a blue (B) spectrum having different wavelengths. The red spectrum has a wavelength of 645 to 700 nm, the green spectrum has a wavelength of 490 to 530 nm, and the blue spectrum has a wavelength of 430 to 480 nm.

Thus, in an embodiment of the present invention, by increasing the intensity of the blue spectrum and using the white color filter instead of the blue color filter the deterioration of the blue color or the reduction of the color index is compensated.

That is, in the image information displayed by the liquid crystal display according to an embodiment of the present invention, because the color filter array substrate 120 having the white color filter is used instead of the blue color filter, the blue color index is reduced and the yellow color is entirely displayed. Accordingly, when the white LED unit 151 for emitting white light is used in the LED backlight unit 150 and the blue component of the optical spectrum generated by the white LED unit 151 increases, it is possible to solve the reduction of the blue color index due to the use of the white (W) color filter.

In addition, the adjustment of the optical spectrum may be performed using a dimming method for controlling the voltage applied to the white LED unit 151 and adjusting the light color depending on the amount of current for the applied voltage. Thus, the adjustment of the optical spectrum is performed by adjusting the intensity of the optical spectrum instead of the wavelength of the optical spectrum (particularly, the blue spectrum). Thus, by increasing the intensity of the blue spectrum, that is, the current flowing through the blue LED in the white LED unit corresponding to the brightness of the image to be displayed, the substantial white light includes the blue component.

The LED backlight unit 150 according to an embodiment of the present invention may also include an inverter (not shown) for controlling the voltage applied to the white LED unit 151 and for increasing the intensity of the blue component among the red (R), the green (G) and blue (B) components forming the white light.

Thus, by increasing the intensity of the blue (B) spectrum among the optical spectrum of the white LED unit 151 to include the blue color in the white light, it is possible to compensate the deterioration of the blue light due to the removal of the blue (B) color filter. Further, by increasing the light transmissivity using the white (W) color filter 123c, it is possible to increase the brightness and the contrast ratio (CR) of the liquid crystal display.

Figure 13:
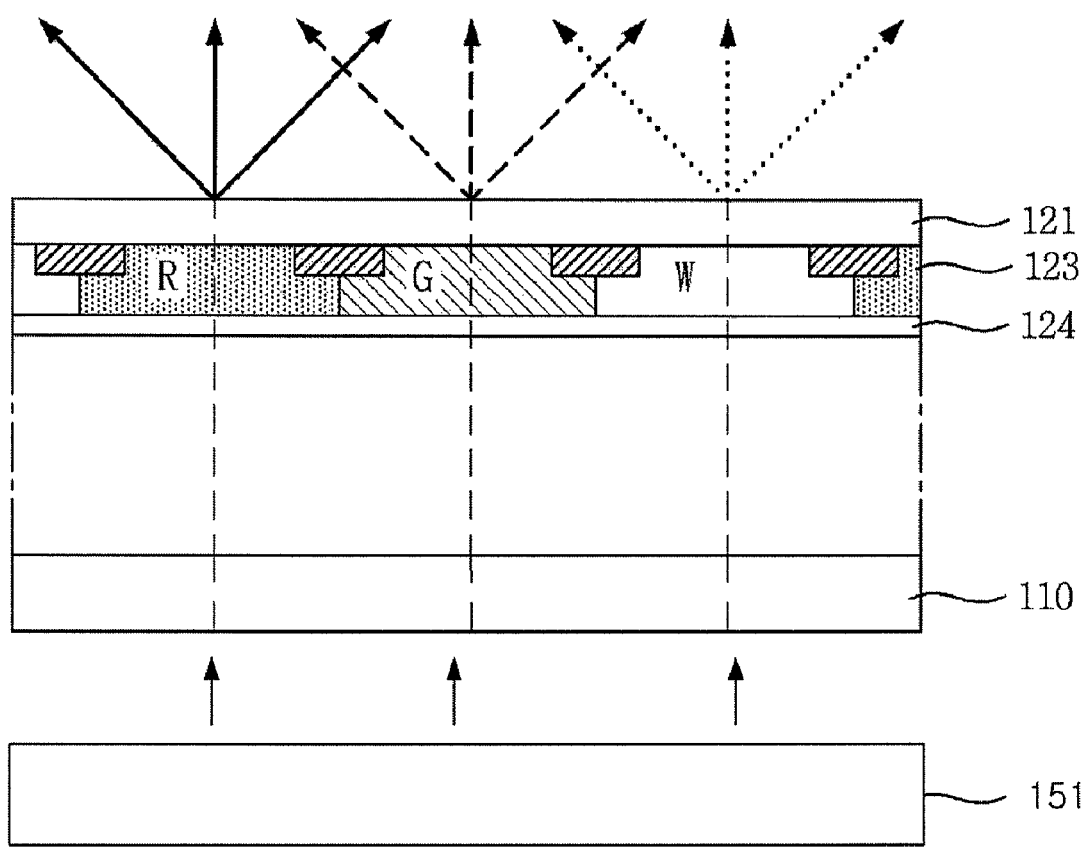
FIG. 13 is an overview explaining a color exhibition of the liquid crystal display according to an embodiment of the present invention.

Turning next to FIG. 13, which is an overview for explaining a color exhibition of an LCD according to an embodiment of the present invention. As shown, the light is transmitted from the white LED unit 151 through the thin film transistor array substrate 110 and the color filter array substrate 120 including the overcoat layer 124, the red (R), green (G) and white (W) color filters 123a, 123b and 123c, and the transparent substrate 121.

Figure 1:
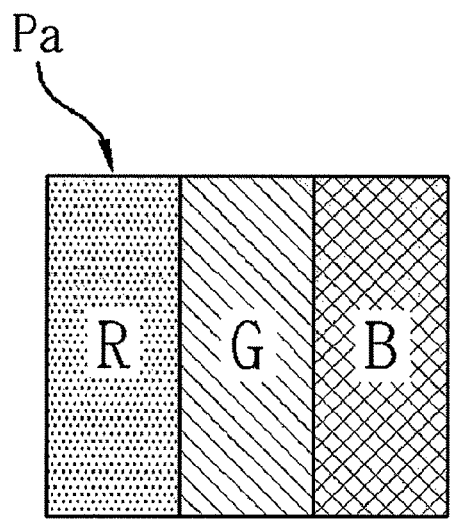
FIG. 1 is an overview illustrating a unit pixel of a related art liquid crystal display.
Figure 2:
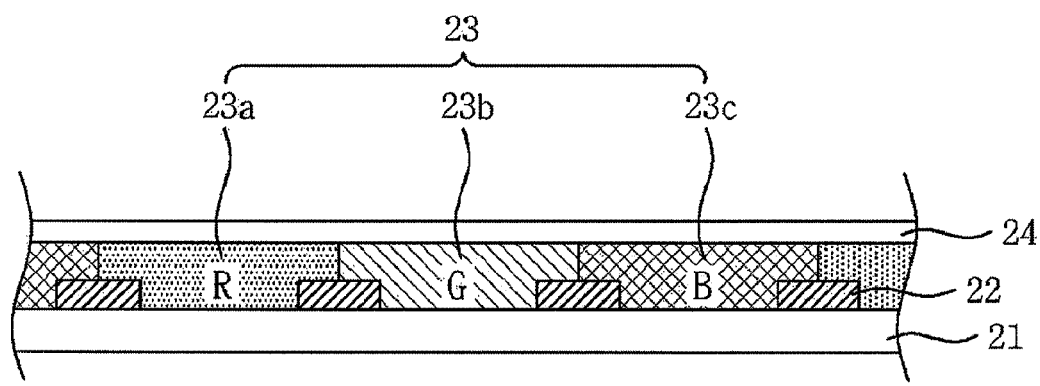
FIG. 2 is a cross-sectional view illustrating a color filter array substrate of the related art liquid crystal display.
Figure 3:
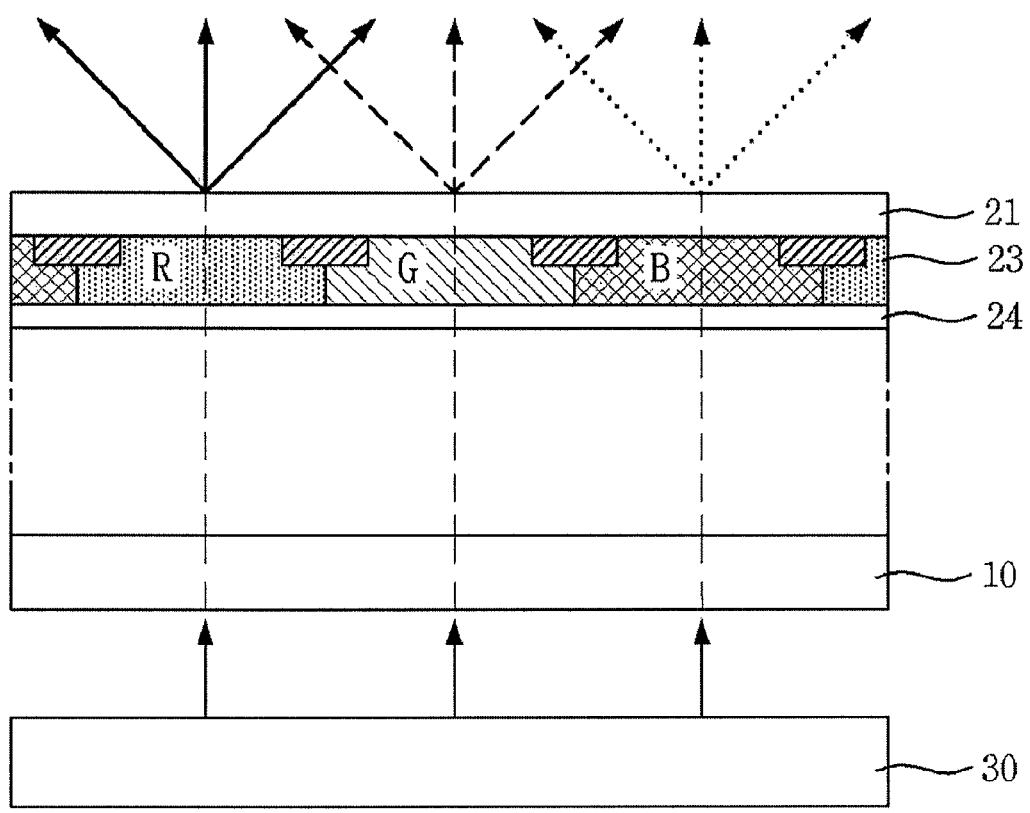
FIG. 3 is an overview explaining color exhibition of the liquid crystal display in the related art.
Figure 4:
FIG. 4 is a picture illustrating an image displayed by the structure shown in FIG. 3.
Figure 14:
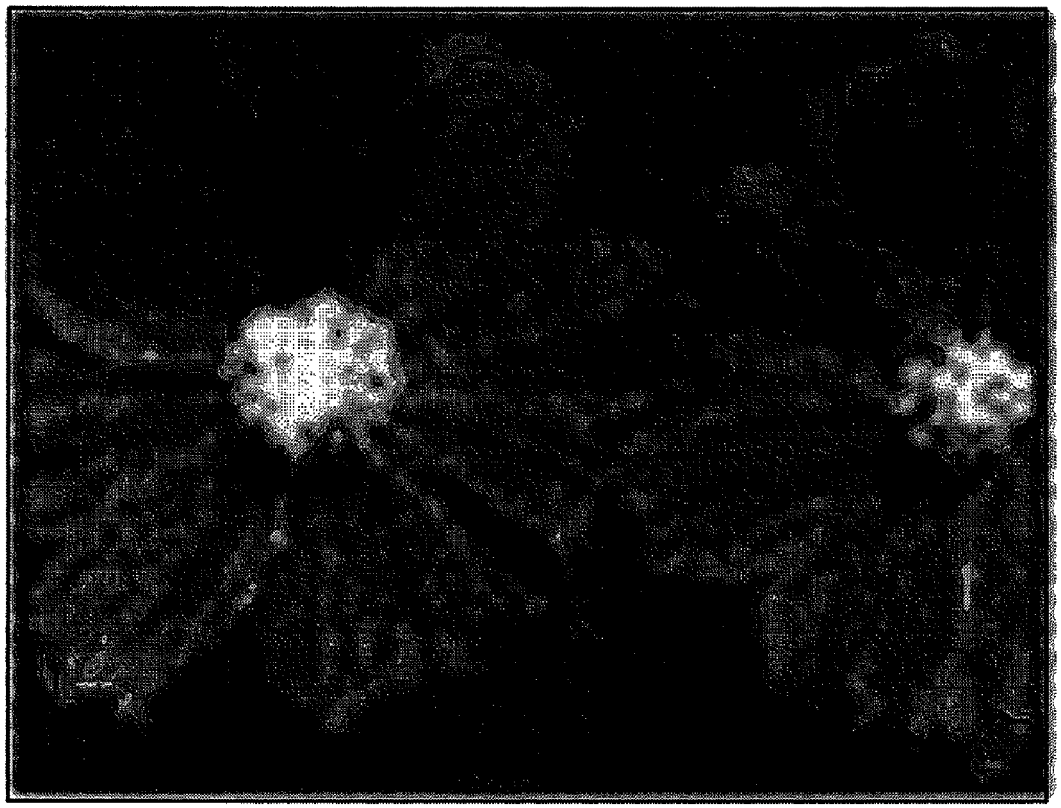
FIG. 14 is a picture illustrating an image displayed by the structure shown in FIG. 13.

At this time, the white LED unit 151 emits the white light and the colorless white color filter 123c emits the white light including the blue spectrum having a high intensity. Thus, as shown in FIG. 14, the image displayed by the embodiment of the present invention has a higher definition and better color exhibition, compared to the image shown in FIG. 4 displayed using the blue color filter.

In the present invention, an LED for emitting white light is used. For example, combining three red, green and blue chips may be used to emit white light. The three chips are also separately controlled. In more detail, FIG. 15 is an overview illustrating a white LED unit of the backlight unit according to an embodiment of the present invention.

Figure 15:
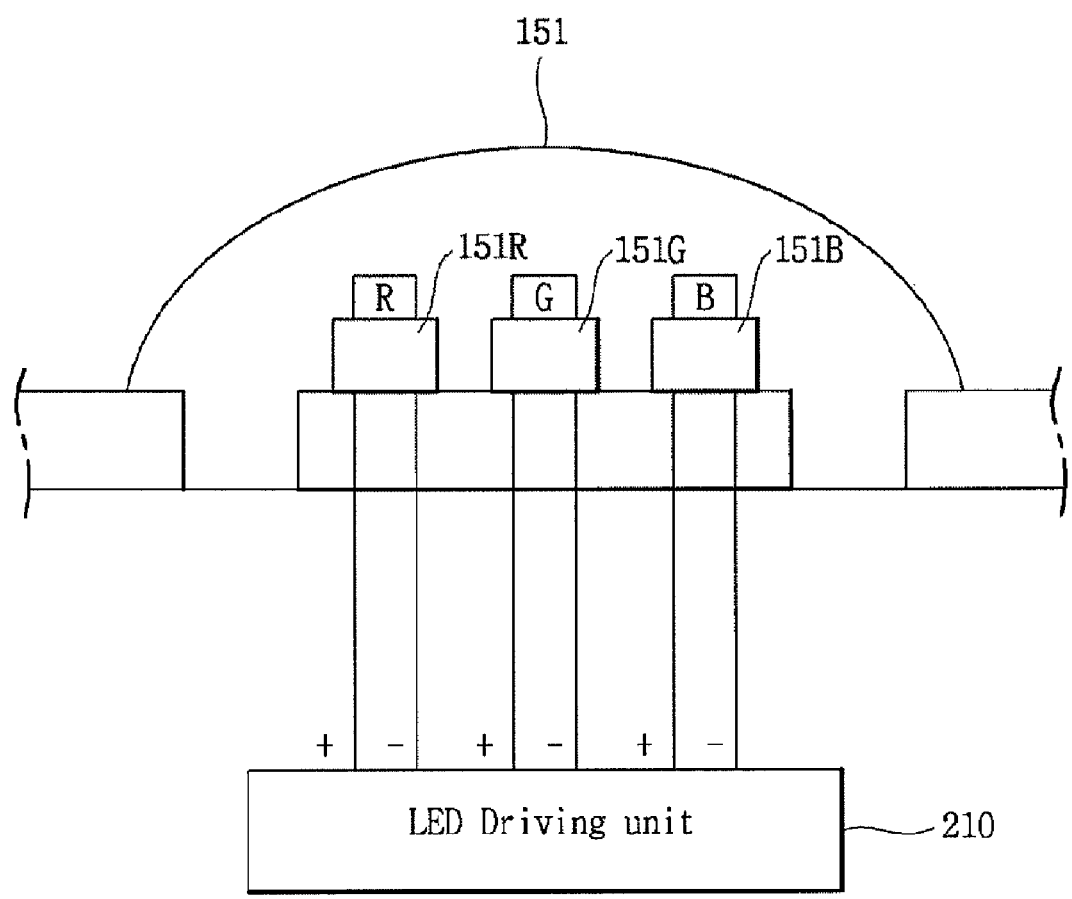
FIG. 15 is an overview illustrating a white LED unit of a backlight unit according to an embodiment of the present invention.

As shown in FIG. 15, the white LED unit 151 includes a red chip 151R, a green chip 151G and a blue chip 151B. Further, the red chip 151R, the green chip 151G and the blue chip 151B are controlled by an LED driving unit 210. Also, to increase the intensity of the blue spectrum of the blue chip 151B, the amount of current applied to the blue chip 151 is increased. Thus, the white light including the blue spectrum having a high intensity can be obtained.

In another example, the backlight unit may include a plurality of LED units. Each unit comprises only one color of LED chip selected from red (R), green (G) and blue (B). Thus, the backlight unit may include a red LED unit, a green LED unit and a blue LED unit. The three LED units are also separately controlled by an LED driving unit. That is, rather than a white LED unit combining the red (R) chip 151R, the green (G) chip 151G and the blue (B) chip 151B as in the example of FIG. 15, a plurality of red, green and blue LED units may be separately used to create white light. One advantage of using separate red, green and blue LED units is that these LED units are less expensive than the white LED unit 151 shown in FIG. 15, for example. Also, to increase the intensity of the blue spectrum of the blue LED unit, the amount of current applied to the blue LED is increased. Thus, the white light including the blue spectrum having a high intensity can be obtained.

Next, FIG. 16 is a flowchart illustrating a method for providing the light with a backlight unit according to an embodiment of the present invention. As shown, a controller determines if the LED unit in the backlight unit is to be driven (S110). That is, the LED unit is driven when the driving of the liquid crystal panel is driven.

Further, as discussed above, in case of a white LED unit, the LED unit includes chips for emitting red (R) light, green (G) light and blue (B) light and emits white light by mixing the red (R), green (G) and blue (B) light. In addition, a current or voltage applied to the white LED unit may be controlled by the LED driving unit 210 using a dimming method which is to control the amount of voltage or current provided to the LED unit.

Next, the brightness of a display image is confirmed (S120). For example, the brightness of the display image can be confirmed by checking gradation data provided from an external system. After confirming the brightness, the amount of current provided to the white LED unit is controlled to adjust the intensity of the blue spectrum (S130). Further, the white light including the blue spectrum having the adjusted intensity is provided to the liquid crystal panel (S140).

Subsequently, the white light is transmitted through the color filter array substrate of the liquid crystal panel. More specifically, when the white light is transmitted through the white color filter, it is possible to exhibit the blue color without alteration.

According to the liquid crystal display of the present invention, a white (W) color filer is used in a color filter array substrate instead of a blue (B) color filter such that the light is entirely transmitted through the white color filter. Accordingly, it is possible to increase the light transmissivity and to improve the brightness and a contrast ratio (C/R) of image information.

Further, the optical spectrum of a light emitting diode for emitting white light is controlled using a dimming method to increase the intensity of a blue spectrum. Accordingly, it is possible to compensate the reduction of the blue color index due to the removal of the blue (B) color filter and to exhibit the image information with high definition.

In addition, because a separate step of forming the white (W) color filter is not performed, it is possible to simplify a manufacturing method and to reduce a manufacturing cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of manufacturing a liquid crystal display comprising:
   forming a color filter array substrate, wherein the color filter array substrate comprises a black matrix formed in a matrix shape to define a red sub-pixel region, a green sub-pixel region and a blue sub-pixel region which form open regions of the black matrix, a red (R) color filter formed in the red sub-pixel region, a green (G) color filter formed in the green sub-pixel region, a white (W) color filter formed in the blue sub-pixel region without forming a blue (B) color filter, and an overcoat layer covering the black matrix, the R color filter, the G color filter and the W color filter, wherein the white color filter and the overcoat layer are formed in a single process using a same material after the R color filter and the G color filter are formed;
   disposing a thin film transistor array substrate oppositely to the color filter array substrate;
   sealing a liquid crystal layer between the color filter array substrate and the thin film transistor array substrate; and
   disposing a backlight unit to a surface of the thin film transistor array substrate, wherein the backlight unit comprises a light emitting diode (LED) unit which provides white light having an adjusted blue spectrum to a surface of the color filter array substrate.

2. The method of claim 1, wherein the LED unit is a white (W) LED unit comprising a combination of a red LED chip, a green LED chip and a blue LED chip to produce the white light, and
   wherein the white LED unit emits the white light by mixing red (R) light, green (G) light and blue (B) light produced by the red, green and blue chips, respectively.

3. The method of claim 1, wherein each LED unit comprises only one color of LED chips selected from red (R), green (G) or blue (B).

4. The method of claim 1, further comprising:
arranging the red (R), green (G) and white (W) color filters in any one of a stripe structure, a delta structure, and a mosaic structure.

5. The method of claim 1, further comprising:
providing an LED driving unit configured to adjust an intensity of the blue spectrum of the white light.

* * * * *